July 6, 1965   C. VAN DER LELY ETAL   3,193,297
DEVICE FOR SPREADING GRANULAR OR POWDERY MATERIAL
Filed Jan. 30, 1962   3 Sheets-Sheet 1

INVENTORS
CORNELIS VAN DER LELY
ARY VAN DER LELY
BY
Mason, Mason & Albright
Attorneys

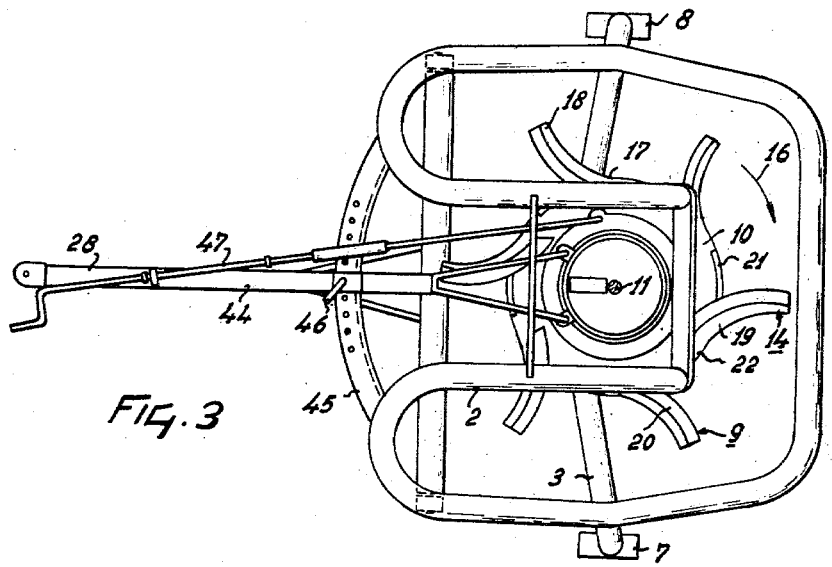
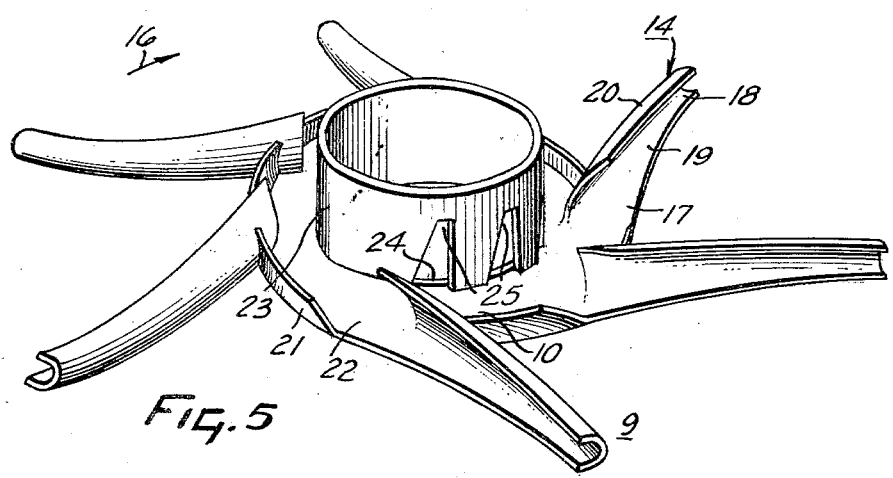

United States Patent Office 3,193,297
Patented July 6, 1965

3,193,297
DEVICE FOR SPREADING GRANULAR OR POWDERY MATERIAL
Cornelis van der Lely, Zug, Switzerland, and Ary van der Lely, Maasland, Netherlands, assignors to C. van der Lely, N.V., Maasland, Netherlands, a Dutch limited-liability company
Filed Jan. 30, 1962, Ser. No. 169,803
8 Claims. (Cl. 275—8)

This application is a continuation-in-part of Serial No. 729,868, now Patent No. 3,025,068, and application Serial No. 729,745, now Patent No. 3,041,076.

This invention relates to a device for spreading granular or powdery material, and is concerned with a device of the kind which includes an ejector disc arranged for rotation—the material to be spread being arranged for feeding onto the disc during the rotation thereof—so that the material is ejected outwardly from the disc. Hence, when the device is moved over the ground while the ejector disc is rotating and material is being fed thereon, the material will be spread over the ground traversed by the device.

It is an object of the invention to provide a device of the kind just set forth in which the spreading of the material will be improved in the sense that it will be spread evenly over a large area.

In accordance with the invention there is provided a device of the kind set forth wherein said ejector disc carries upstanding cambered blades extending beyond the disc, the convex side being, as seen in a direction along the rotational axis of the disc, bent rearwardly with respect to the direction of rotation of the disc.

The invention will now be described more fully with reference to one embodiment. In the drawings:

FIGURE 3 is a plan view of parts of the device shown in FIG. 1;

FIGURE 5 is a sectional view taken on the line V—V of FIG. 4.

Figure 1:
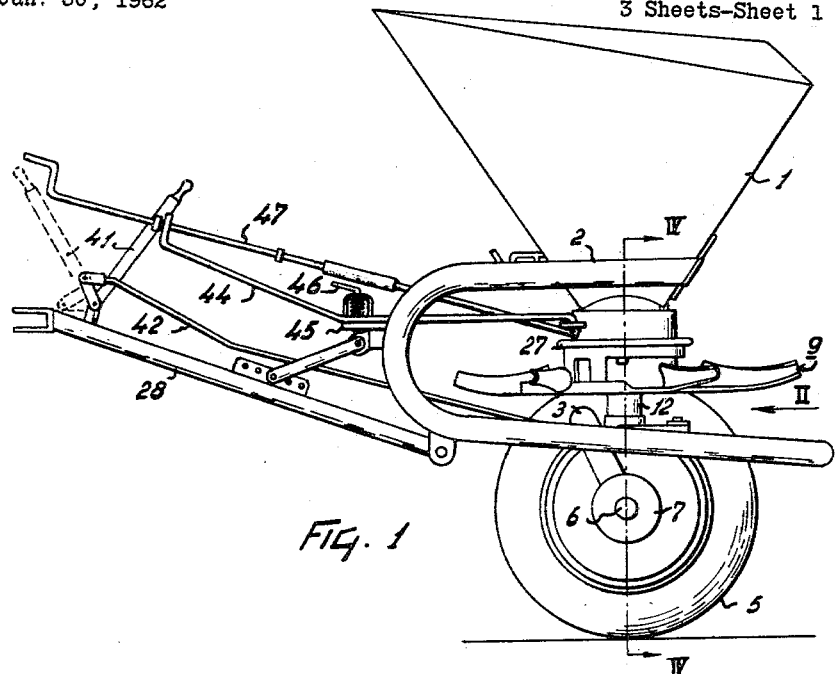
FIGURE 1 is a side view of a device according to the invention.
Figure 2:
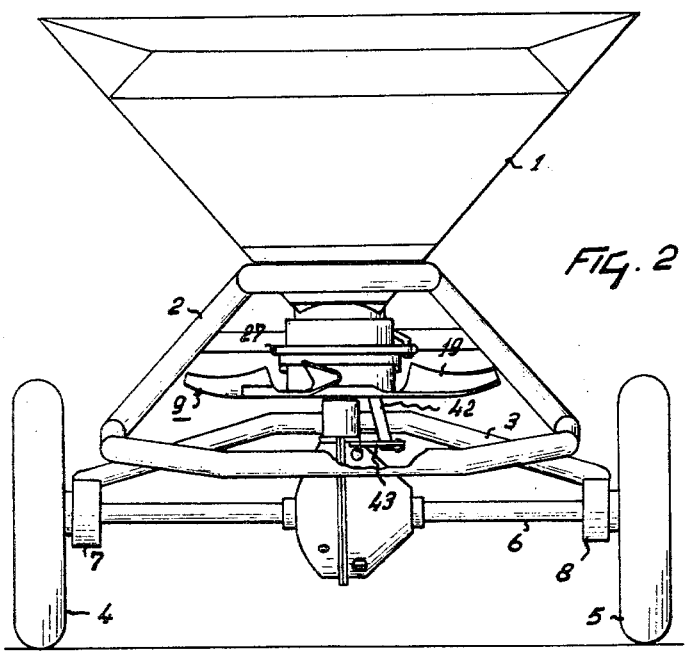
FIGURE 2 is an end elevation of the device shown in FIG. 1, viewed in the direction of the arrow II.

Referring to the figures, the device comprises a hopper or container 1 which is supported by frame beams 2 and 3, which are supported by two running wheels 4 and 5 secured to an axle 6 which is mounted in bearings 7 and 8 provided on the frame beam 3.

Below the container 1 is arranged an ejector 9 comprising a disc member 10, which is rigidly seated on a shaft 11 which is journalled in a bearing 12, connected with the frame beam 3 by means of a bolt 13. The ejector disc 10 is provided with six blades 14, which extend beyond the ejector disc 10 and which are curved, as seen in a direction along the rotational axis 15 of the disc, the convex sides of these curvatures, viewed in the direction of rotation 16 of the ejector 9 being orientated backwardly. The blades are arranged in a manner such that the beginning 17 of a blade is tangential to the periphery of the ejector disc, which lies concentrically with respect to the axis 15. The outer ends 18 of the blades are substantially radial to the periphery of the ejector disc.

Each blade 14 is shaped in the form of a channel, of which the sides 19 and 20 are at an angle to each other of less than 90°. Towards the end of a blade 14 the angle between the sides decrease gradually and near the end 18 of a blade, i.e. near that part which is remotest from the shaft 11, they are substantially parallel to each other.

In order to prevent the material from leaving the disc 10 without being spread by the blades 14, upright edges 21 are provided, which extend from the convex side of a blade 14 to the supply opening 22 of a further blade 14. Since part of the disc 10, arranged between the running wheels 4 and 5, is located at a lower level than the highest points of the running wheels 4 and 5, the ends of the blades 14 are curved upwardly with respect to the disc 10, so that the blades throw the material over the running wheels 4 and 5.

The connection between the container 1 and the ejector disc 10 comprises a cylindrical ring 23, which bears freely on the disc 10. This cylindrical ring is centered with respect to the rotary axis 15 of the disc 10 by means of a disc 24, which is rigidly secured to the disc 10.

Figure 4:
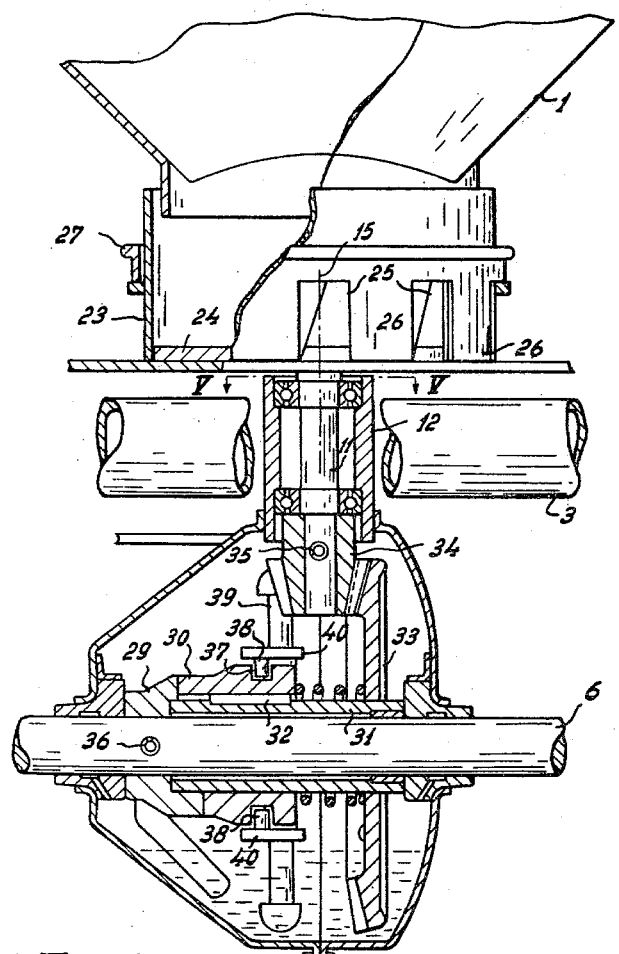
FIGURE 4 is a vertical sectional view taken on the line IV—IV of FIG. 1, with parts shown in elevation.

For the supply of the material from the container 1 to the ejector disc 10, provision is made for three discharge openings 25 in the cylindrical ring 23. Two of such openings 25 are shown in FIGURE 4. The quantity of the material to be supplied to the ejector 9 may be controlled by providing slide portions 26 adapted to be moved in front of the discharge openings 25. These slides 26 depend from a ring 27, which surrounds the ring 23.

In order to obtain a rotation of the ejector 9 when the device is moved by exerting a tractive force on the draw arm 28 connected with the frame beam 2, the shaft 11 is linked to the supporting wheels 4 and 5 by means of a driving mechanism and a clutch. The supporting wheels 4 and 5 are intercoupled by means of the axle 6, to which a clutch half 29 is secured by means of a stud 36, whereas a further clutch half 30 is arranged on a sleeve 31 and is secured against rotation about the sleeve 31 by a spline 32. To the sleeve 31 is rigidly secured a conical gear wheel 33 which co-operates with a conical gear wheel 34 which in turn is rigidly secured to the shaft 11 by means of a stud 35.

In order to engage and disengage the driving means of the spreading member 9, the clutch halves 29 and 30 can be moved into and out of each other by displacing the clutch portion 30 over the sleeve 31. The clutch portion 30 is displaced over the sleeve 31 by means of a groove 37 in the said portion, in which studs 38 are arranged and which connect with a shaft 39 by means of arms 40. By turning the shaft 39 through an angle, the clutch portion 30 is displaced along the sleeve 31.

The rotation of the shaft 39 can be actuated for engaging and disengaging the spreading member 9 by means of a lever 41 provided on the draw arm 28. The lever 41 is linked to the shaft 40 by a rod 42 and a lever 43.

In order to control the position of the discharge openings 25 in the ring 23 relative to the lower end of the container, a rod 44 is connected to the ring 23. The rod 44 bears against the upper face of the cross bar 45 which is provided with a series of apertures to receive a pin 46 carried by the rod 44. The rod 44 bears a rod 47 which is connected with the ring 27 so as to rotate the ring 27 around the ring 23 and to fix the position of the ring 27 relative to the ring 23 for controlling the size over which the slides 26 cover the discharge openings 25.

In operation of the device the ejector 9 will rotate in a direction according to the arrow 16 whereby the blades 14 throw the seed outwardly. The fertilizer, seed or other material to be spread will be supplied to the beginning ends 17 of the blades 14, since the discharge openings 25 lie within the circle described by the inner ends of the blades when the ejector disc is rotating. The outer ends of the blades are curved upwardly at their outer ends so that the material to be spread will be thrown out above the wheels 4 and 5.

The above description and drawings disclose one embodiment of the invention, and specific language has been employed in describing the figures. It will, nevertheless, be understood that no limitations of the scope of the invention are thereby contemplated, and that variations, alterations and modifications may be made as would occur to one skilled in the art to which the invention relates.

What we claim is:

1. In a device for spreading granular or powdery material including a source with a cylindrical lower end for such material, a substantially horizontally disposed rotatable ejector disc below said lower end, motive means for rotating said disc, and a plurality of blades connected to and extending substantially tangentially rearwardly from said disc relative to its direction of rotation, each of said blades curving outwardly from said disc whereby the outer end of each of said blades is substantially radial to the center of said disc, and each of said blades including a channel facing the direction of rotation of said disc, a ring member situated with its lower end within a space enclosed by the inner ends of said blades, the upper end of the ring member snugly embracing and being rotatable about said cylindrical lower end, a control member to hold said ring member selectively in one of a series of positions relative to the said cylindrical lower end, said ring member having one or more discharge ports through which material to be spread is discharged in a substantially horizontal direction to the disc and the blades.

2. In a device for spreading granular or powdery material including a source for said material, said source having a cylindrical lower end, a substantially horizontally disposed rotatable ejector disc below said cylindrical lower end, motive means for rotating said disc, and blades channel-shaped in cross section connected to and extending substantially tangentially rearwardly from said disc relative to its direction of rotation, said blades each thereupon curving outwardly from the center of the ejector disc whereby the outer end of each of said blades is substantially radial to the center of said disc, the channel of each blade facing the direction of rotation of said disc, upstanding wall portions being provided between the blades, said wall portions abutting the back of the blades relative to their direction of rotation, said blades having inner ends defining a circular space, a ring member situated with its lower end within said space, the upper end of the ring member snugly embracing and being rotatable about said cylindrical lower end, a control member to hold said ring member selectively in one of a series of positions relative to the said cylindrical lower end, at least one discharge port in said ring member through which material to be spread is discharged in a substantially horizontal direction to the disc and the inner ends of the blades.

3. A rotatable ejector member for a device for spreading granular or powdery material, comprising a disc portion and a plurality of blades channel-shaped in cross section, said blades being connected to and extending substantially tangentially rearwardly from said disc portion relative to its direction of rotation, said blades each curving outwardly from the center of said disc whereby the outer end of each of said blades is substantially radial to the center of said disc portion, the open side of each channel-shaped blade facing the direction of rotation, said blades having opposing longitudinal edges, the opposing longitudinal edges being disposed at an angle of less than 90° with respect to each other at their inner ends adjacent the center of said disc, said angle decreasing towards the outer end of the blade and near the outer end the said longitudinal edges being substantially parallel to one another, upstanding wall portions being provided on said disc between the blades, said wall portions abutting the back of each blade relative to its direction of rotation and extending to the open foreside of the next blade.

4. In a device for spreading granular or powdery material including a hopper for such material, a substantially horizontally disposed rotatable ejector disc below said hopper, motive means for rotating said disc, and a plurality of blades each connected to and extending substantially tangentially rearwardly from said disc relative to its direction of rotation, said blades each thereupon curving outwardly from said disc whereby the outer end of each of said blades is substantially radial to the center of said disc, a ring member near the lower end of the hopper bearing freely on said ejector disc, said member lying within a space enclosed by the inner ends of blades, a disc member secured to said ejector disc for centering said ring member, at least one discharge port in said ring member through which material to be spread is discharged in a substantially horizontal direction to the disc and the blades.

5. A rotatable ejector member for a device for spreading granular or powdery material, comprising a disc portion and a plurality of channel-shaped blades integrally formed therewith and extending substantially tangentially rearwardly from said disc portion relative to its direction of rotation, the open side of each channel-shaped blade facing the direction of rotation, said blades each curving outwardly from said disc whereby the outer end of each of said blades is substantially radial to the center of said disc portion, the outer ends of said blade each being inclined upwardly relative to said disc portion, the upper side of the lower longitudinal surface of each of said blades being contiguous with and merging smoothly into the upper side of the said disc portion.

6. A rotatable ejector member as claimed in claim 5 wherein each of said blades extend for at least one-half of its length beyond said disc portion.

7. A rotatable ejector member as claimed in claim 5, wherein the opposing longitudinal edges of said blades are disposed at an angle of less than ninety degrees with respect to each other and said angle decreasing towards the outer end of the blade.

8. A rotatable ejector member as claimed in claim 5, wherein said disc portion is provided peripheral upstanding wall portions between said blades.

References Cited by the Examiner

UNITED STATES PATENTS

| | | | |
|---|---|---|---|
| 136,107 | 2/73 | Strow Bridge | 275—8 |
| 386,339 | 7/88 | Miller | 275—15 |
| 421,634 | 2/90 | Techtonius | 275—15 |
| 579,049 | 3/97 | Eltzroth | 275—12 |
| 892,553 | 7/03 | Roby et al. | 275—7 XR |
| 1,107,992 | 8/14 | Parrish | 275—8 |
| 1,166,476 | 1/16 | Parrish | 275—15 |
| 1,231,269 | 6/17 | Kindling | 275—8 |
| 2,766,872 | 10/56 | Pillsbury | 275—8 XR |
| 3,025,068 | 3/62 | Lely et al. | 275—8 |

ABRAHAM G. STONE, *Primary Examiner.*

A. JOSEPH GOLDBERG, WILLIAM A. SMITH, III,
*Examiners.*